US006535606B2

(12) United States Patent
Cox

(10) Patent No.: US 6,535,606 B2
(45) Date of Patent: *Mar. 18, 2003

(54) MOBILE TELEPHONE SHOULDER REST

(76) Inventor: James Cox, 3405 S. Brunson, Oklahoma City, OK (US) 73119

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/531,377

(22) Filed: Mar. 21, 2000

(65) Prior Publication Data

US 2002/0164016 A1 Nov. 7, 2002

(51) Int. Cl.⁷ .............................................. H04M 1/00
(52) U.S. Cl. ..................................................... 379/449
(58) Field of Search ................................. 379/449, 446, 379/455, 454; D14/138

(56) References Cited

U.S. PATENT DOCUMENTS

| | | | |
|---|---|---|---|
| 3,902,025 A | 8/1975 | Lewis | 179/157 |
| D278,057 S | 3/1985 | McMaster | D14/65 |
| 4,759,058 A | 7/1988 | Sutton | 379/449 |
| 4,802,211 A | 1/1989 | Huntley | 379/454 |
| 4,878,237 A * | 10/1989 | Cianflone | 379/446 |
| 4,944,005 A | 7/1990 | Van Dyke | 379/449 |
| 4,961,223 A | 10/1990 | Sutton | 379/449 |
| 5,008,932 A | 4/1991 | Sieggen | 379/449 |
| 5,115,465 A | 5/1992 | Freer | 379/449 |
| 5,503,313 A | 4/1996 | Wei | 224/197 |
| 5,529,271 A * | 6/1996 | Dunchock | 379/446 |
| 5,668,869 A | 9/1997 | Zinno | 379/449 |
| D395,545 S * | 6/1998 | Crim, Jr. | D14/138 |

\* cited by examiner

Primary Examiner—Jack Chiang
(74) Attorney, Agent, or Firm—R. William Graham

(57) ABSTRACT

A telephone shoulder rest for use with a telephone headset includes a telephone shoulder rest member having a phone receiving surface, a first hook and loop portion connected to the phone receiving surface, a complementary second hook and loop portion removably connected to the first hook and loop portion, wherein the second hook and loop portion has an adhesive backing for connection to a surface of a telephone headset. The shoulder rest member includes an inner foam material and an outer surface which is printable thereon and includes a unique predetermined printed indicia thereon.

10 Claims, 2 Drawing Sheets

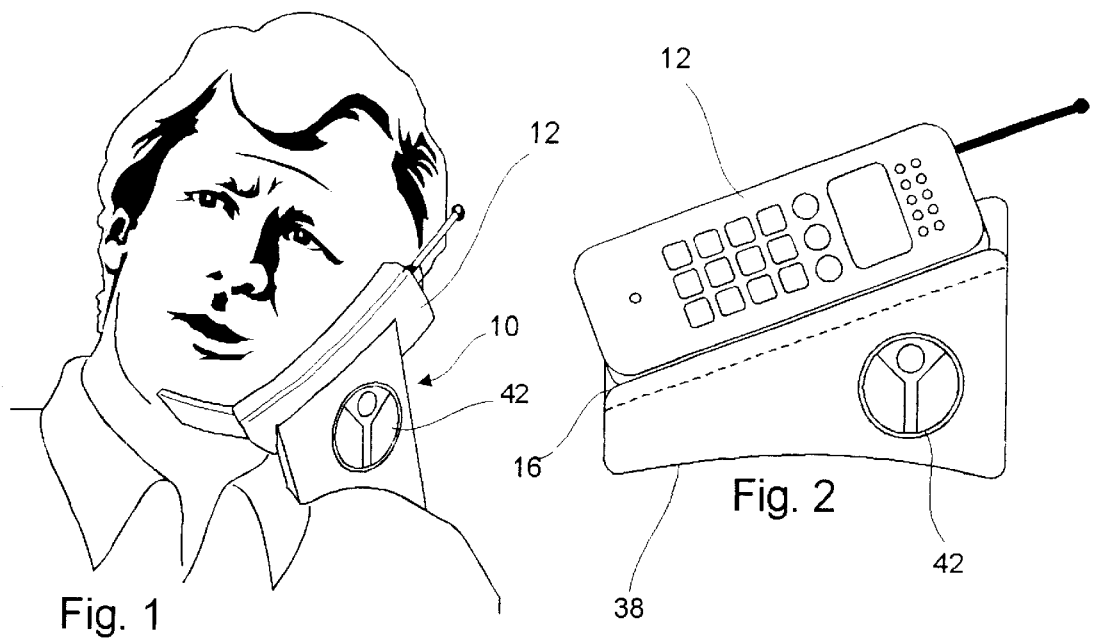
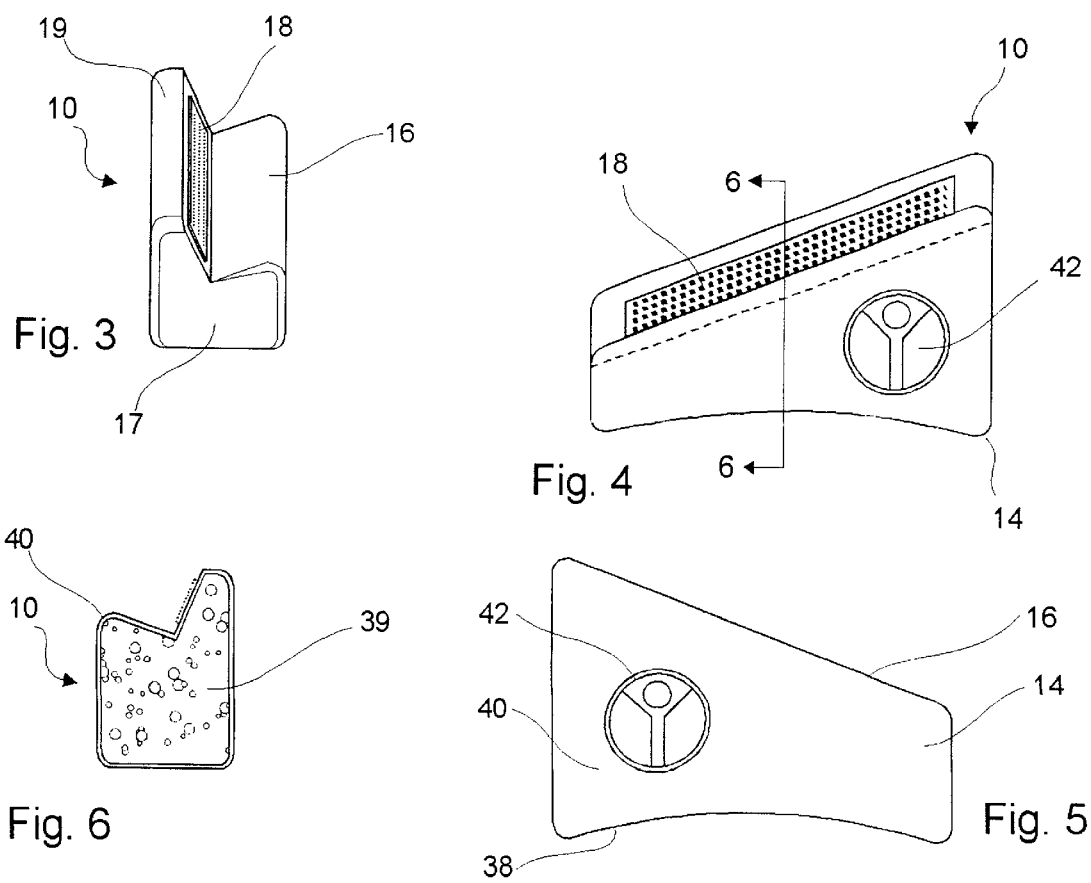

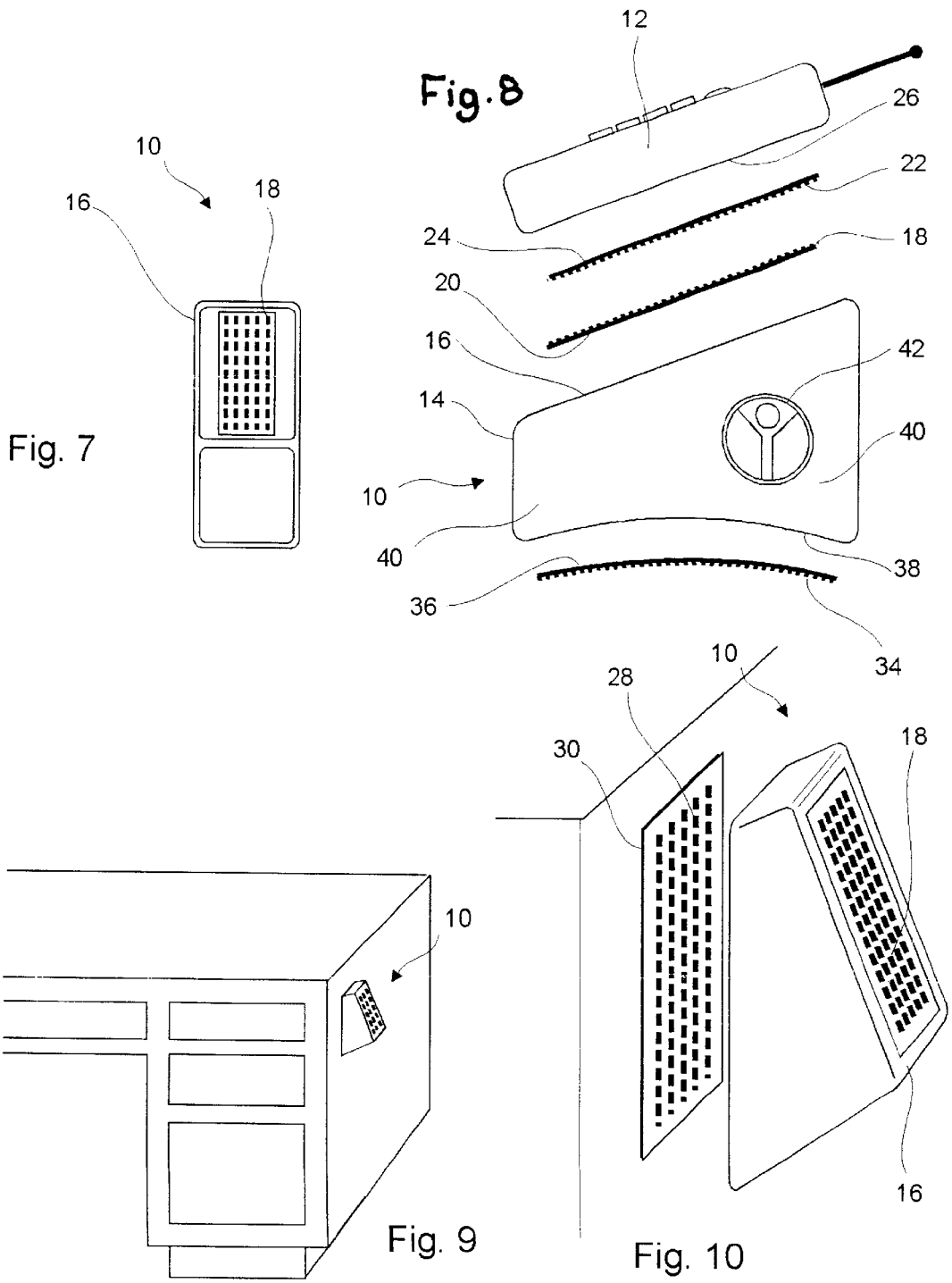

MOBILE TELEPHONE SHOULDER REST

BACKGROUND OF THE INVENTION

1. Field of the Invention

The present invention relates to the field of shoulder rests for telephone headsets. More particularly, the invention is directed to a mobile telephone shoulder rest which is readily detachable to a mobile phone and further directed to a shoulder rest system which lends itself to interchangeability of parts to convey a plurality of predetermined indicia.

2. Related Art

There exist a number of shoulder rests and mounting devices for telephone headsets. For example, U.S. Pat. Nos. 4,759,058, 4,802,211, 4,961,223, 4,944,005, 5,008,932, 5,115,465, 5,668,869 and D278,057 disclose such devices which aid holding a telephone adjacent one's head without the need of one's hands.

While these devices provide solutions to a hands-free use of the phone, few of these devices have met with marketable success in the mobile phone arena. Such devices are relatively cumbersome to employ, expensive and not easily stored in a vehicle.

There remains a need to improve the means for holding a phone, particularly mobile phones, without the need for using one's hands. Also, there remains a need for providing a shoulder rest system which lends itself to interchangeability of shoulder rest parts, wherein each part includes a unique predetermined indicia. There also remains a need to provide a more user friendly shoulder rest which can be readily stored independently or with the phone.

BRIEF SUMMARY OF THE INVENTION

It is an object to improve telephone headset shoulder rests.

It is another object to improve the aesthetic enjoyment of shoulder rests for telephone headsets.

It is still another object to provide a shoulder rest system which lends itself to interchangeability of shoulder rest parts, wherein each part includes a unique predetermined indicia.

A further object is to provide a more user friendly shoulder rest which can be readily stored.

Still another object is to provide a more user friendly shoulder rest which permits the shoulder rest and associated phone to be readily stored together.

Accordingly, the present invention is directed to a telephone shoulder rest which is particularly well suited for mobile phone usage. The telephone shoulder rest includes a telephone shoulder rest member having a phone receiving surface having a first hook and loop portion and a complementary second hook and loop portion detachably connected to the first hook and loop portion. The second hook and loop portion has an adhesive backing for connection to a surface of telephone headset. There is also a release backing provided to cover the adhesive backing.

Also, provided is a third hook and loop portion which is also complementary to the first hook and loop portion with an adhesive backing with associated release backing for connection to a surface of the vehicle. Optionally, a fourth loop portion provided is complementary to the third hook and loop portion with an adhesive backing with associated release backing for connection to another surface of the shoulder rest.

A shoulder rest system is also provided which lends itself to interchangeability of shoulder rest members, wherein each shoulder rest member includes a unique predetermined indicia, such as a company logo or a sport memorabilia. The system provides for an enhanced aesthetic effect and enjoyment of the phone.

Other objects and advantages will be readily apparent to those skilled in the art upon viewing the drawings and reading the detailed description hereafter.

BRIEF DESCRIPTION OF THE DRAWINGS

FIG. 1—depicts the telephone shoulder rest of present invention in use.

FIG. 2—depicts one embodiment of the invention in place on rest.

FIG. 3—depicts an end view of the present invention.

FIG. 4—depicts a side view of the present invention.

FIG. 5—depicts another side view having a printed indicia thereon.

FIG. 6—depicts a cross section showing foam inside an printable outer cover of the invention.

FIG. 7—depicts an end view of another embodiment of the invention.

FIG. 8—depicts a side view of the embodiment in FIG. 7.

FIG. 9—depicts the embodiment in FIG. 7 at rest stored against surface.

FIG. 10—depicts a storing of the present invention.

DETAILED DESCRIPTION OF THE INVENTION

Referring now to drawings, the telephone shoulder rest, which is particularly useful for mobile phone 12, is generally referred to by the numeral 10. The telephone shoulder rest 10 includes a telephone shoulder rest member 14 which is generally wedge shaped. While a shape of the telephone shoulder rest member 14 is shown, it is contemplated that other shapes can be employed to carry out the spirit of the invention and the same are to be covered under the claims appended hereto. The telephone shoulder rest member 14 has a phone receiving surface 16.

A first hook and loop portion 18, such as VELCRO, is provided with an adhesive backing 20 to permit connection to the phone receiving surface 16. FIGS. 1–5 depict the phone receiving surface 16 as V-shaped which can aid the user in positioning the phone 12 adjacent one's ear. FIGS. 7–10 show the phone receiving surface 16 as generally planer. A release backing (not shown) can be provided to cover the adhesive backing 20 so that the first hook and loop portion 18 can be independently deployed onto the surface 16. It is further contemplated that the hook and loop portion 18 may be connected to the surface 16 integrally or by other means such as stitching. The shoulder rest 14 includes a lower seat portion 17 and a higher seat back portion 19 to which the first hook and loop portion 18 is connected. The lower seat portion and higher seat back portion 19 form a non-upright or canted V-shape.

A complementary secondhook and loop portion 22 is provided for removable connection to the first hook and loop portion 18. The second hook and loop portion 22 likewise has an adhesive backing 24 for enabling connection to a back surface 26 of phone 12. There is also a release backing (not shown) provided to cover the adhesive backing 24. When the phone 12 has the second hook and loop portion 22 connected to its back surface 26, the phone 12 can be operably disposed on its side with its back surface 26 resting against higher seat back portion 19. Also, provided is a third hook and loop portion 28 which is also complementary to the first hook and loop portion 18 for removable connection therewith and has an adhesive backing 30 and associated release backing (not shown) for connection to a sure 32 of a vehicle, desk or other support surface. Optionally, a fourth hook and loop portion 34 can be provided which is complementary to the third hook and loop portion 28 for removable connection therewith and likewise includes an adhesive backing 36 with associated release backing (not shown) for connection to a shoulder receiving surface 38 of the shoulder rest member 14. The shoulder receiving surface 38 is arcuate.

A shoulder rest system is provided by the present invention which lends itself to interchangeability of shoulder rest members 14, wherein each shoulder rest member 14 includes a unique predetermined printed indicia 42, such as a company logo or a sport memorabilia. The system provides for an enhanced aesthetic effect and enjoyment of the phone. Further, the invention provides for quick storage of the shoulder rest member 14 as well as the phone 12. The hook and loop portions described provide for a quick and convenient positioning of the phone 12 and shoulder rest member 14, for example, on a position of a vehicle dashboard which is readily within the reach of the driver arm length.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A mobile telephone shoulder rest for use with a mobile telephone, which comprises:

a telephone shoulder rest member having a lower seat portion and a higher seat back portion forming a generally canted V-shaped phone receiving surface, wherein said telephone shoulder rest member is manufactured from a foam material having an inner resilient open cell structure and an outer exposed surface;

a first hook and loop portion connected to said higher seat back portion of said phone receiving surface; and a complementary second hook and loop portion removably connected to said first hook and loop portion, wherein said second hook and loop portion has an adhesive backing for connection to a back surface of a mobile telephone.

2. The telephone shoulder rest of claim 1, which further includes a release backing removably disposed on said adhesive backing.

3. The telephone shoulder rest of claim 1, which further includes a third hook and loop portion which is complementary to said first hook and loop portion for removable connection therewith and has an adhesive backing for connection to a surface of the vehicle.

4. The telephone shoulder rest of claim 3, which further includes another release backing removably disposed on said adhesive backing of said third hook and loop portion.

5. The telephone shoulder rest of claim 4, which includes a fourth hook and loop portion which is complementary to said third hook and loop portion for removable connection therewith, said fourth hook and loop portion having an adhesive backing for connection to another surface of said shoulder rest member.

6. The telephone shoulder rest of claim 5, which further includes another release backing removably disposed on said adhesive backing of said fourth hook and loop portion.

7. The telephone shoulder rest of claim 5, wherein said another surface of said shoulder rest member is characterized to be a shoulder rest surface having an arcuate aspect.

8. The telephone shoulder rest of claim 1, wherein at least a portion of said outer exposed surface includes a unique indicia printed thereon and wherein said indicia serves as one of an advertisement and a memorabilia.

9. The telephone shoulder rest of claim 1, wherein said shoulder rest member is wedge shaped.

10. The telephone shoulder rest of claim 1, wherein said lower seat portion includes an arcuate shoulder receiving surface.

* * * * *